J. P. FISHER.
CARRIAGE WHEEL AND AXLE.

No. 30,915.

2 Sheets—Sheet 1.

Patented Dec. 18, 1860.

Witnesses.
J. W. Coombes.
R. S. Spencer.

Inventor.
J. P. Fisher
per Munn & Co.
Attorneys

J. P. FISHER.
CARRIAGE WHEEL AND AXLE.

No. 30,915. Patented Dec. 18, 1860.

Witnesses.
J. W. Coombs.
R. S. Spencer

Inventor.
J. P. Fisher
per Munn & Co
Attorneys

UNITED STATES PATENT OFFICE.

J. P. FISHER, OF ROCHESTER, NEW YORK.

CARRIAGE-WHEEL.

Specification of Letters Patent No. 30,915, dated December 18, 1860.

*To all whom it may concern:*

Be it known that I, J. P. FISHER, of Rochester, in the county of Monroe and State of New York, have invented a new and useful Improvement in Carriage Wheels and Axles; and I do hereby declare that the following is a full, clear, and exact description thereof, reference being had to the accompanying drawings, in which—

Figure 1:
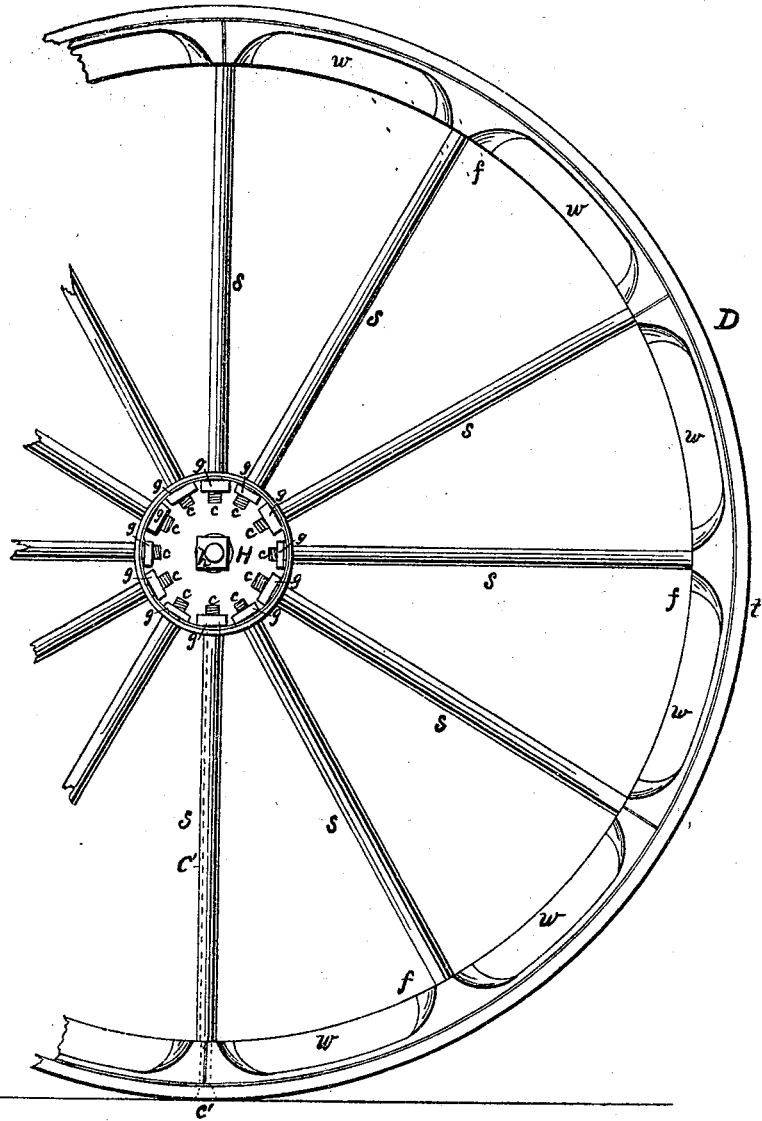
Figure 2:
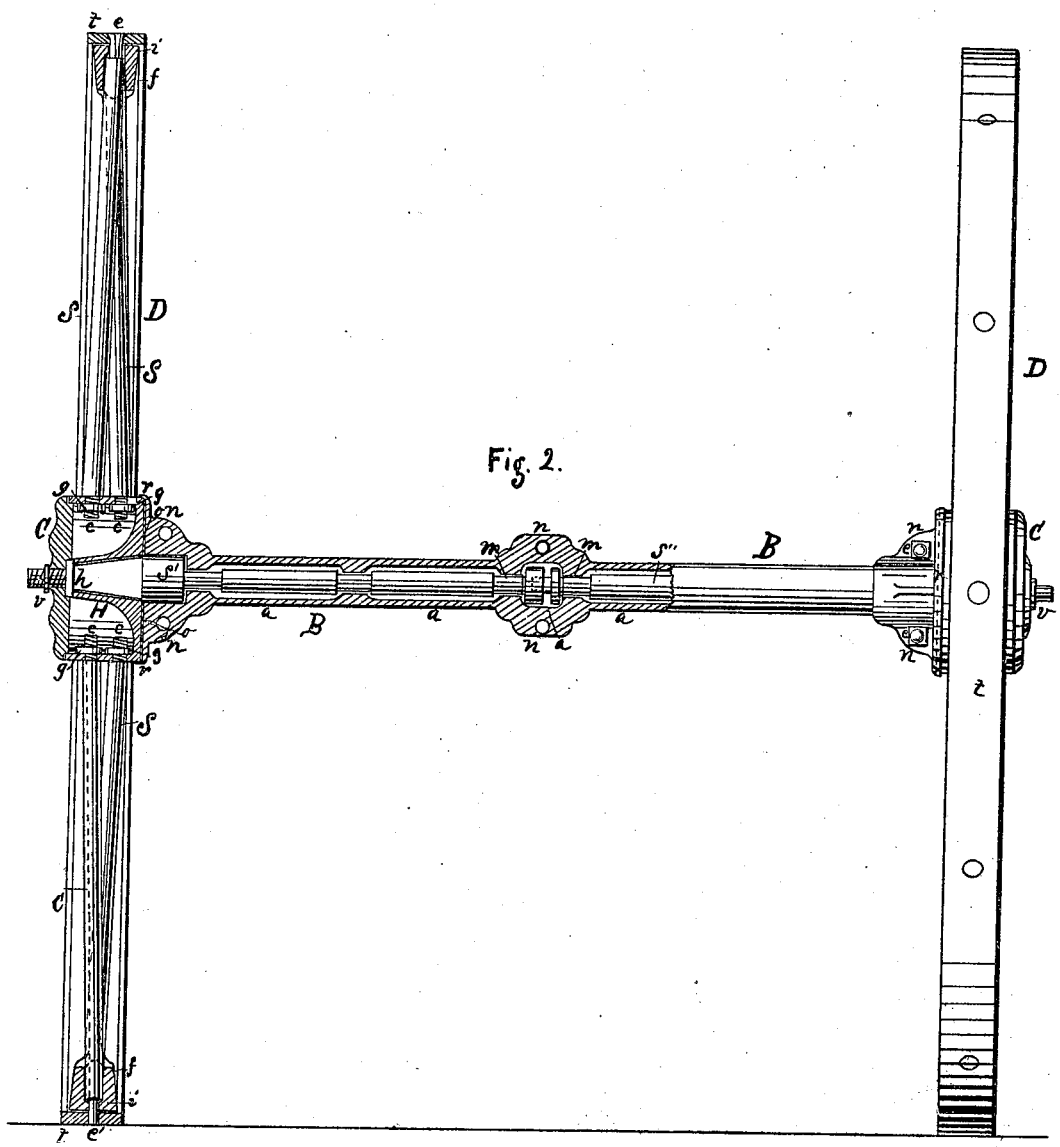

Figure 1 is a side elevation of a part of one wheel with the cap C, removed. Fig. 2 is a transverse vertical section of one wheel, showing a portion of one of the longitudinal halves of the tube B, removed.

Similar letters of reference in both figures represent corresponding parts.

To enable those skilled in the art to make and use my invention I will proceed to describe its construction with reference to the drawing.

The wheels D, are composed of several metallic "trus" fellies $f$, the tire $t$, tubular spokes $s$, and binding rods $c$, the hub H, and its inclosing cap C.

The axle is composed of two spindles $s'$, and $s''$, and the shell or tube B.

The hub H, is cast of brass or other suitable material in form of a cup or hollow cylinder, and having a stem in its center, as seen in Fig. 2, with a square taper hole through it, and to which the shank of the spindle $s'$, is fitted, and is secured thereto by the nut $h$, on the outside.

The fellies represented by the several letters $f$, are made in skeleton form, as seen in Fig. 1, and in segments, each measuring two spaces between the spokes, to receive one spoke in the center, and having a rim nearly as wide as the tire, with a web $w$, in the center running from one spoke to another. The holes in the fellies which receive the outer ends of the spokes $s$, are contracted so as to form the shoulder $i$, seen in Fig. 2, against which the ends of the spokes rest.

The binding rods $c$, are provided with a countersunk head $c'$. The tire is drilled to match the spoke holes in the fellies, and the said rods $c$, are put in through the tire $t$, and hollow spokes $s$, and the rim of the hub H, and receive the nuts $g$, on the inside of the hub, by means of which the several parts are drawn together securely, after which the open end of the hub is perfectly inclosed by the ornamental cap C, which is securely attached by the nut $v$. The spokes $s$, should be connected with the hub as shown in Fig. 2, every other one alternately being connected at one end of said hub, and the others at the other end.

The tube of the axle B, is made in two parts longitudinally and they are recessed out as indicated by the several letters $a$, in Fig. 2, and are provided with flanges $n$, in the center and at each end, through which the bolts $e$, pass, which secures them together. There is a rim $r$, provided on each end of the tube which encircles the back end of the hub H, to prevent sand, etc. from working in between the revolving parts, and it incloses the metallic washer $o$, which is placed between the end of the tube and the hub, as seen in Fig. 2. The application of this washer $o$, is designed to greatly decrease the friction between these parts.

The recesses $a$, may contain the lubricating substance.

The spindles $s'$, and $s''$, are made alike except at the ends where they meet, where the point of $s''$, enters the end of $s'$, as shown by the dotted lines. The end of each spindle is enlarged, which prevents the wheels from spreading apart, by the said enlargement striking against the shoulders $m$, of the tube.

The reach and side braces for connecting the front and hind axle may be attached to the tube B, by the bolts $e$.

What I claim as new, and desire to secure by Letters Patent, is—

The combination of the binding rods $c$ with the hollow spokes $s$, hub H and fellies $f$ in the manner herein shown and described.

J. P. FISHER.

Witnesses:
JOHN J. BOWEN,
C. F. CROSMAN.